(12) United States Patent
Watson

(10) Patent No.: US 9,103,371 B2
(45) Date of Patent: Aug. 11, 2015

(54) SELF-COUPLING TRACK CLAMP FOR SECURING A LINEAR MOTION GUIDE TRACK TO A SUPPORT BASE WITHOUT THE USE OF FASTENERS, AND METHODS FOR IMPLEMENTING SAME

(71) Applicant: Bishop-Wisecarver Corporation, Pittsburg, CA (US)

(72) Inventor: Nigel S. Watson, Martinez, CA (US)

(73) Assignee: Bishop-Wisecarver Corporation, Pittsburg, CA (US)

( * ) Notice: Subject to any disclaimer, the term of this patent is extended or adjusted under 35 U.S.C. 154(b) by 0 days.

(21) Appl. No.: 13/947,997

(22) Filed: Jul. 22, 2013

(65) Prior Publication Data

US 2013/0309006 A1 Nov. 21, 2013

Related U.S. Application Data

(63) Continuation of application No. 12/260,754, filed on Oct. 29, 2008, now Pat. No. 8,491,193.

(51) Int. Cl.

| F16C 19/00 | (2006.01) |
| F16C 29/00 | (2006.01) |
| F16C 29/04 | (2006.01) |

(52) U.S. Cl.
CPC ............. *F16C 29/004* (2013.01); *F16C 29/005* (2013.01); *F16C 29/045* (2013.01); *Y10T 29/49641* (2015.01); *Y10T 403/7064* (2015.01)

(58) Field of Classification Search
CPC .... F16C 29/004; F16C 29/005; F16C 29/045; Y10T 29/49641; Y10T 403/7064

USPC ........ 384/50, 53, 54, 55, 57, 58, 59; 403/373, 403/374.1, 381; 248/307, 313

See application file for complete search history.

(56) References Cited

U.S. PATENT DOCUMENTS

| 3,416,282 | A | 12/1968 | Daugherty |
| 3,461,466 | A | 8/1969 | Weaver et al. |
| 5,553,947 | A | 9/1996 | Scheib et al. |

FOREIGN PATENT DOCUMENTS

EP           0258714        *    3/1988

* cited by examiner

*Primary Examiner* — James Pilkington
(74) *Attorney, Agent, or Firm* — Brian Beverly; Beeson Skinner Beverly, LLP

(57) ABSTRACT

A track clamp for coupling linear motion guide tracks with standard linear motion support bases without the use of fasteners comprises a clamp body having a plug portion and an outwardly-opening guide track-receiving channel, the plug portion having outwardly-extending deformable protrusions on its outer surfaces that, upon insertion of the plug portion into a selected slot of a support base, deform upon engagement with the slot thereby securing the plug portion in the slot, the track-receiving channel holding a linear motion guide track. In one embodiment upwardly-extending clamp arms formed in the plug portion by the guide track receiving channel deflect inwardly upon insertion of the plug portion into the selected slot thereby clamping the guide track in the channel.

12 Claims, 7 Drawing Sheets

SELF-COUPLING TRACK CLAMP FOR SECURING A LINEAR MOTION GUIDE TRACK TO A SUPPORT BASE WITHOUT THE USE OF FASTENERS, AND METHODS FOR IMPLEMENTING SAME

CROSS-REFERENCE TO RELATED APPLICATIONS

This is a continuation application of application Ser. No. 12/260,754, filed Oct. 29, 2008.

BACKGROUND OF THE INVENTION

1. Technical Field

The invention relates generally to methods and apparatus for assembling a linear track in a guided motion system. In particular, the invention relates to a track clamp that supports a quick and easy method of assembling linear guided motion tracks to standard support bases.

2. Description of the Prior Art

Linear motion guides are used extensively in manufacturing processes and other applications. In manufacturing processes and within manufactured capital goods themselves, precise and repeatable motion is useful and often essential. For example, in manufacturing processes ranging from machining to textiles to electronics, tool heads or other items move back and forth and must do so precisely and repeatedly over enormous numbers of cycles. In another example, specimens and instrumentation move relative to each other within laboratory analytic devices to collect data on the samples and must do so precisely and repeatedly.

Guide wheels attached to support bases and riding on guide rails represent one class of guided motion technology that provides precise and repeatable kinematics. For example, U.S. Pat. No. 3,661,431 discloses guide wheels and tracks in which guide wheels cooperate with rails such that the guide wheels move along the rails.

Guide tracks and guide wheels for the linear motion systems are typically standard articles of manufacture and are widely available. An exemplary track used in guided motion application in the prior art is shown in FIG. 1. The V-shaped edge track 120 and a DualVee® guide wheel 110 shown in FIG. 1, both manufactured by Bishop-Wisecarver Corporation, located in Pittsburg, Calif., are time-tested and ideal for a wide variety of applications. The track 120 is coupled to an extruded support base 130.

Known support bases are typically extrusions available in standardized sizes and configurations. For example, support base 130 illustrates a standard aluminum extrusion support base, manufactured by Parker Hannifin Corporation, located in Cleveland, Ohio, that is widely used within the guided motion industry.

Also widely used in the guided motion industry are self-coupling track clamps for coupling linear motion tracks to support bases. FIG. 1 illustrates a known track clamp 125 for coupling a V-shaped edge track 120 to a support base 130. Prior art track clamps configured for fitting standard support bases have been overly complicated, time consuming, difficult and expensive to assemble, and unreliable due to the use of moving parts, among other shortcomings. In short, there are disadvantages in the current state of the art. In particular, known track assemblies require the use of fasteners (not shown) to couple the track clamp 125 to the guide track 120. Using fasteners requires maintaining a greater inventory of parts, results in a more elaborate manufacturing process, and creates a greater potential for movement between the parts of a guided motion apparatus.

Due to the deficiencies in the prior art, there is a need for a reliable, effective and easy-to-assemble track clamp for use with linear guided motion support bases.

SUMMARY OF THE INVENTION

The invention provides novel approaches to manufacturing and assembling linear motion slides that are quick and easy to install without using traditional fasteners. More particularly, the invention discloses a novel self-coupling track clamp that couples guide tracks with standard linear guided motion support bases without using traditional fasteners.

The elimination of traditional fasteners, such as threaded fasteners, results in lower manufacturing costs, faster assembly, and increased structural integrity due to the elimination of drilled or tapped holes in the guide track. In one aspect of the invention, deformable protrusions are used to form a durable interconnection with guided motion support bases.

In one embodiment of the invention track clamps have protrusions that deform upon press-fit coupling with a support base. Deformation of the track clamp protrusions securely joins the track clamp to the support base without the use of traditional fasteners.

Various embodiments of the invention include track clamps designed to couple guide tracks to support bases in a variety of configurations including guide tracks disposed orthogonally to a support base. In some embodiments of the present invention, track clamps are designed with shoulders to provide extra support to withstand lateral forces bearing on the track.

In some embodiments of the invention, the track clamp is designed to couple with slots in a variety of extrusions or barstock material. In one embodiment of the invention, the track clamp is formed to couple a V-shaped edge track, manufactured by Bishop-Wisecarver Corporation, with T-shaped slots formed in standard structural extrusion support bases.

Some aspects of the invention comprise low cost methods of installing linear motion guide tracks into structural extrusion support bases. In one embodiment, the novel track clamp is installed using a soft-headed mallet. In another embodiment, the track is installed by using a cross-head arrangement of rollers to uniformly apply force to insert the track clamp and guide track into a standard structural extrusion support base.

In some embodiments of the invention, track clamps are configured to couple with widely available standard aluminum extrusion support bases such as those manufactured by Parker Hannifin Corporation. In other embodiments of the invention, track clamps are formed to accommodate V-shaped edge guide tracks used to control the motion of DualVee® guide wheels manufactured by Bishop-Wisecarver Corporation.

Still other embodiments of the invention disclose methods of manufacturing self-coupling track clamps with deformable teeth extrusions.

DETAILED DESCRIPTION OF THE INVENTION

Figure 1:
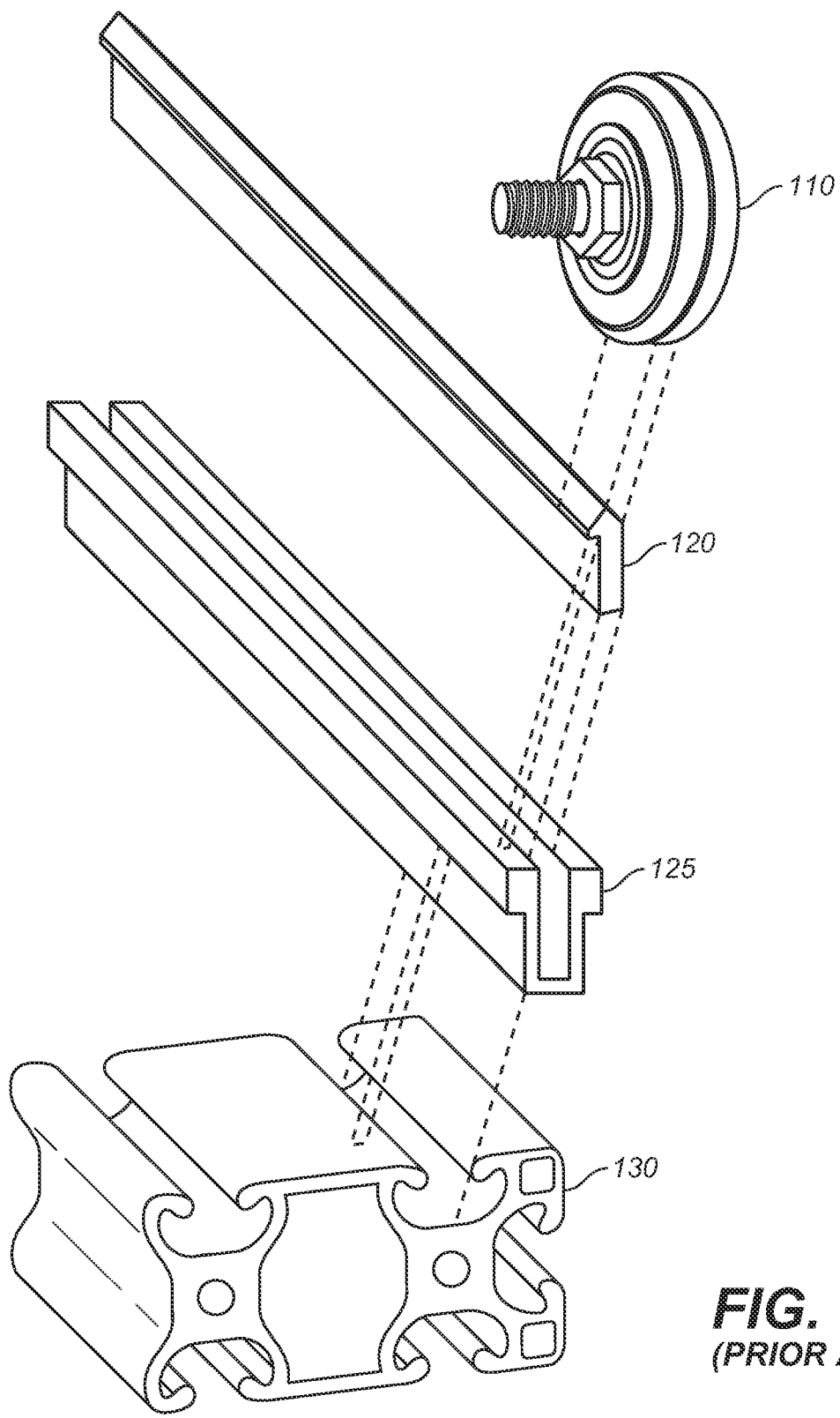
FIG. 1 is an exploded view of a prior art guided linear motion track clamp that requires fasteners.
Figure 2A:
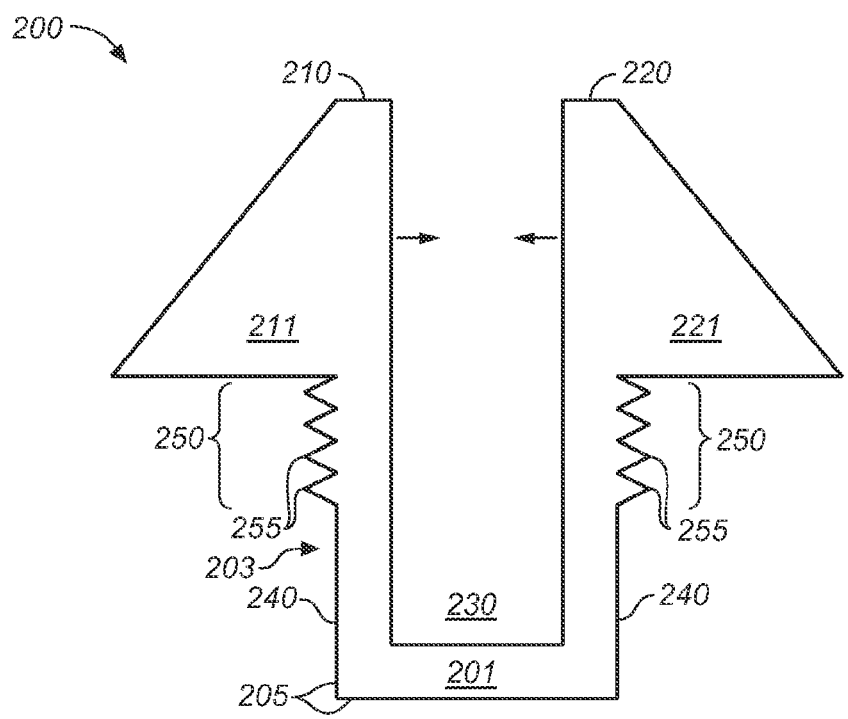
FIG. 2A is an end view of a self-coupling track clamp according to the invention.
Figure 2B:
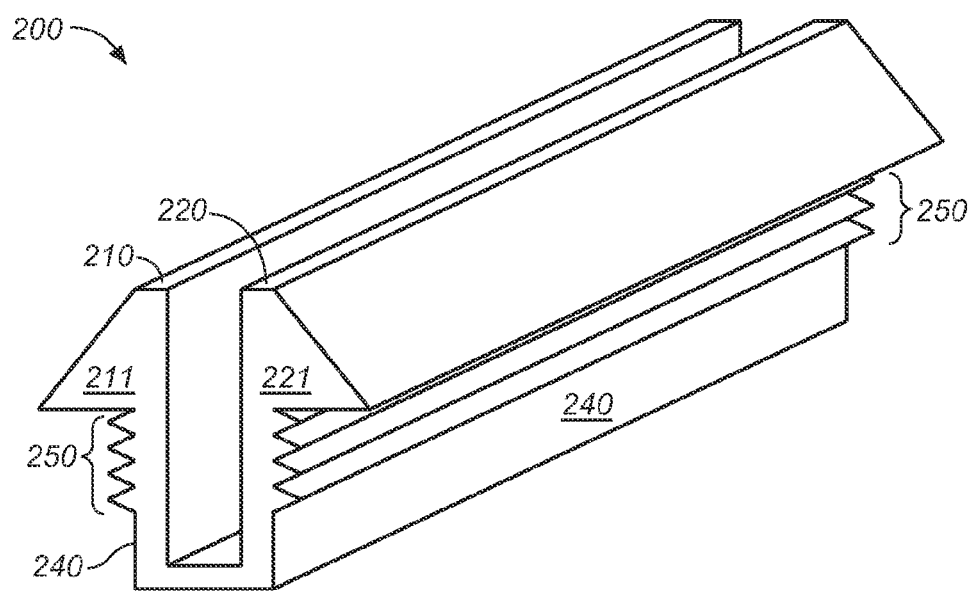
FIG. 2B is an isometric view of the self-coupling track clamp shown in FIG. 2A.

A self-coupling track clamp for securing a linear motion guide track to a support base without the use of fasteners is referred to generally at 200 in FIGS. 2A and 2B. The track clamp 200 comprises two clamp arms 210, 220 that are connected to the base section 201 of a clamp body 203. As shown, the two clamp arms 210, 220 extend upwardly from the base section 201 to define an outwardly-opening guide track-receiving channel 230.

Figure 2C:
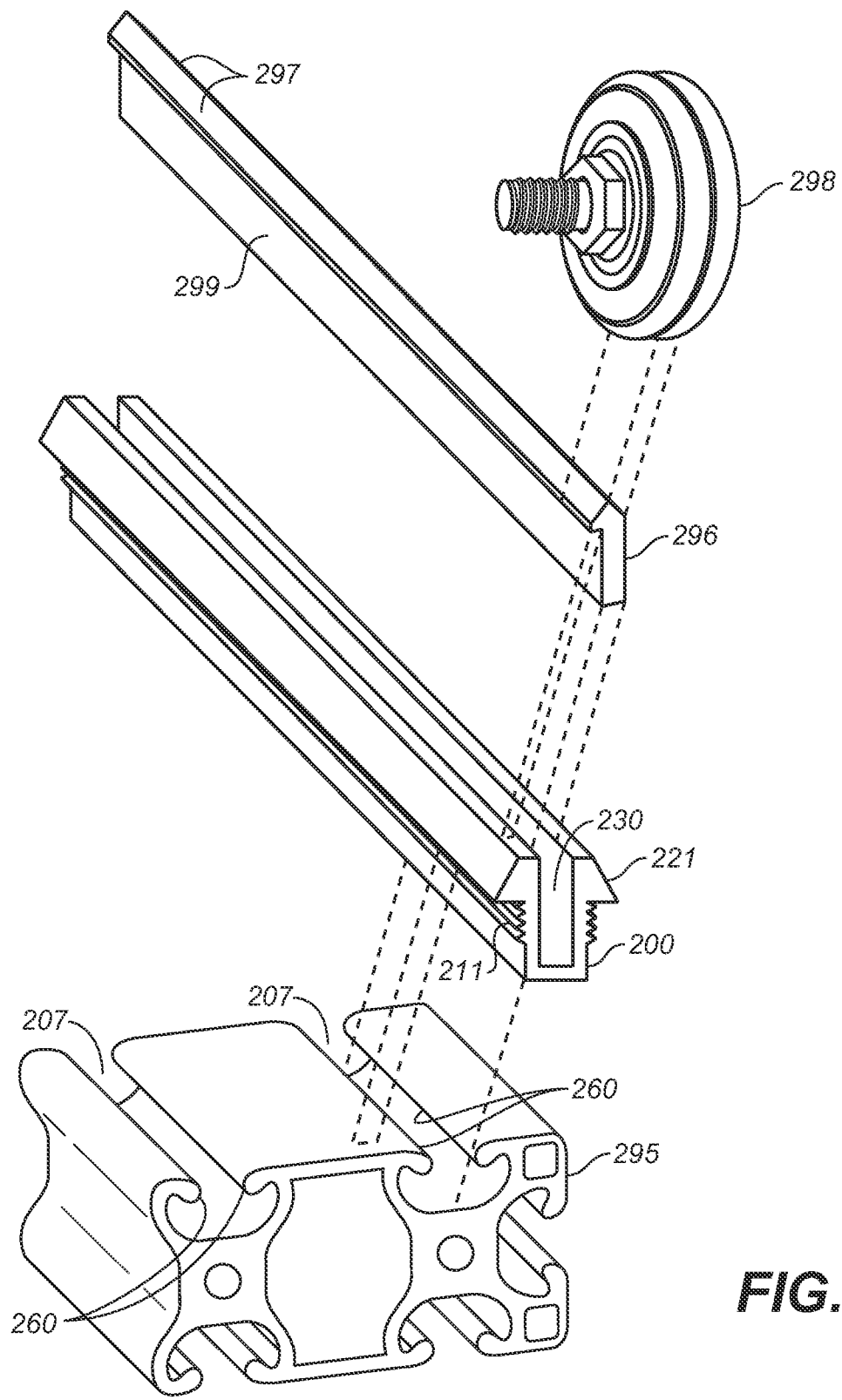
FIG. 2C is an exploded view of a guided linear motion track assembly using a self-coupling track clamp according to the invention.

With additional reference to FIG. 2C, the channel 230 of the track clamp 200 is configured to receive a linear motion guide track 296 of the type having a guide surface 297 for engaging guide wheel 298 and a retention block 299 extending from the guide wheel. Two shoulders 211, 221 are disposed on the upper ends of clamp arms 210, 220. The base section 201 and clamp arms 210, 220 of the track clamp 200 form a plug portion 205 that is configured to be inserted into a selected slot 207 of a support base 295 so that channel 230 is disposed within the support base. The shoulders 211, 221 engage with the top surface of support base 295 to provide additional support against lateral forces acting on the guide track 296. Two sets of deformable teeth-like protrusions 250 are disposed on the outer surfaces 240 of the clamp arms 210, 220 as shown. In the illustrated embodiment, the distance between the outer edges 255 of the protrusions 250 is slightly greater than the width of each slot 207 in the support base 295 such that when the plug portion 205 of the track clamp 200 is inserted into a selected slot 207 in the support base 295, the protrusions 250 deform against the opposing inner surfaces 260 of the slot 207, thus coupling track clamp 200 securely to support base 295 without using traditional fasteners.

In the embodiment of the invention illustrated in FIGS. 2A-2C, the deformation of protrusions 250 causes clamp arms 210, 220 to be displaced toward each other, as indicated by the arrows in FIG. 2A, thereby clamping onto and securing the linear motion guide track in channel 230. In some embodiments of the invention, the deformation of protrusions 250 effectuates a cold-pressure solid-state welding process.

In some embodiments of the invention, the track clamp is configured so that it may be coupled with the support base using only basic tools such as a rubber mallet. In other embodiments, a cross-head arrangement of rollers 360 is used to insert the track clamp and guide track into a support base. See FIG. 3. However, it will be readily apparent to those having ordinary skill in the art that a wide variety of coupling mechanisms can be used.

It is anticipated that the track clamp 200 will be used to secure a V-shaped edge track as shown in FIGS. 2C, 4, 5 and 6, such as the DualVee® guide wheel manufactured by Bishop-Wisecarver Corporation. Nevertheless, it will be understood by those of skill in the art that a guide track having virtually any profile may be joined to a support base using a track clamp according to the invention.

Figure 3:
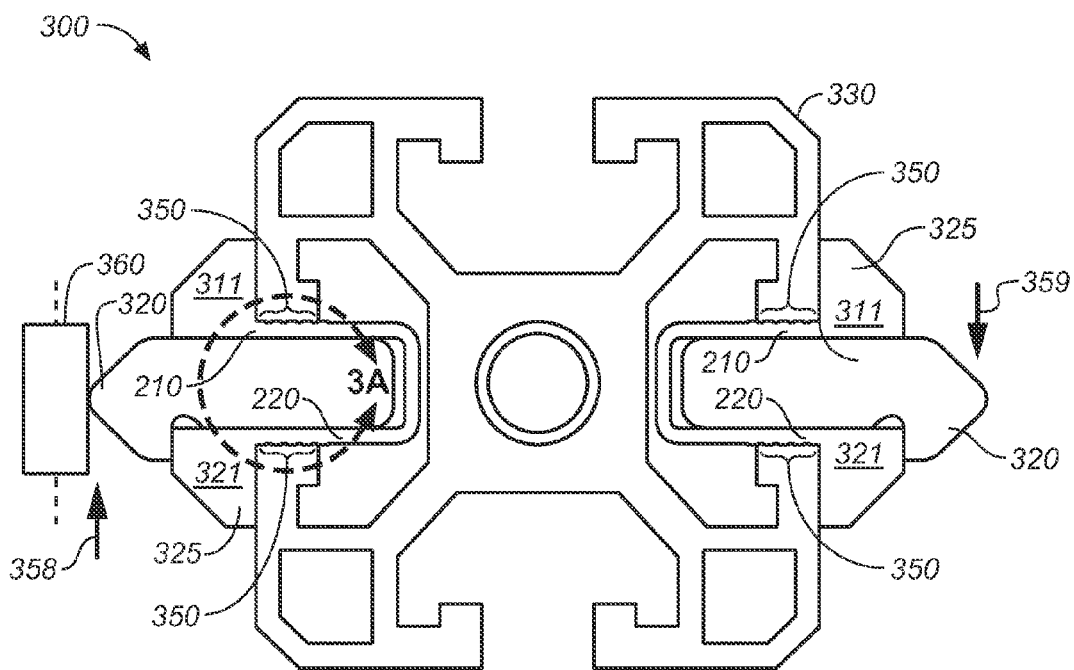
FIG. 3 is an end view of a support base coupled with a pair of linear motion tracks using self-coupling track clamps according to the invention.
Figure 3A:
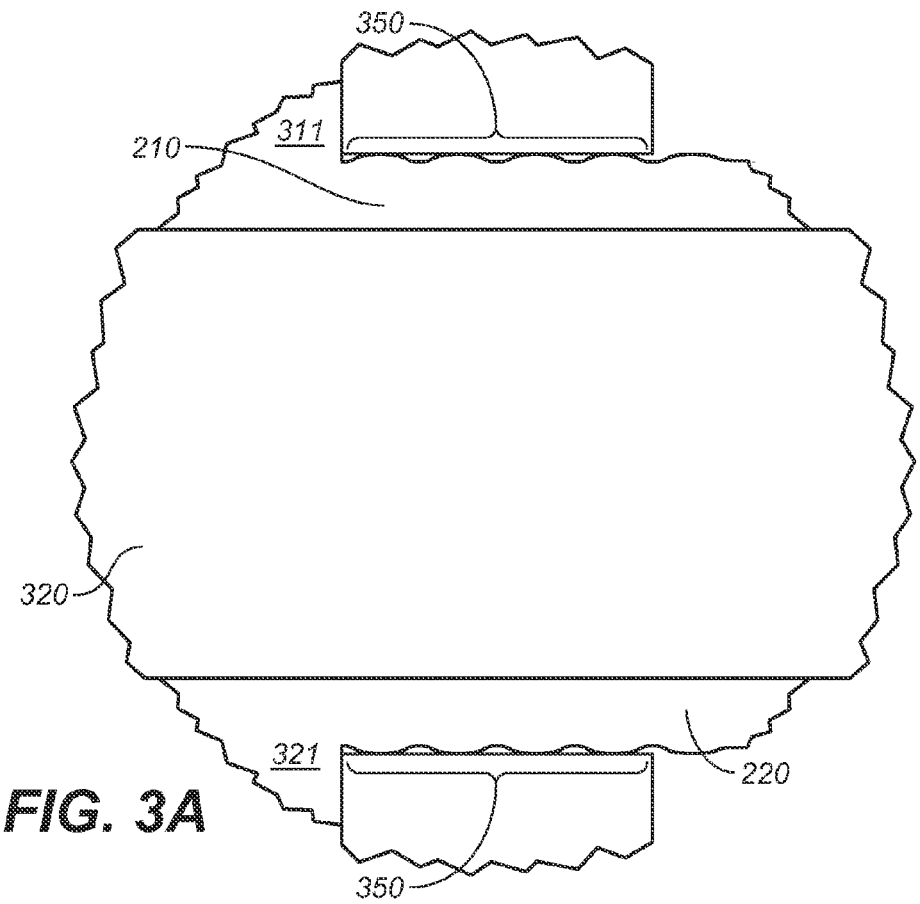
FIG. 3A is an enlarged view of a portion of the support base and one of the linear motion guide tracks shown in FIG. 3 showing the deformed protrusions on the clamp arms of one of the self-coupling track clamps.

With reference now to an alternate embodiment 300 of the invention shown in FIGS. 3 and 3A, it is seen that track clamp 325 has been press-fitted into the support base 330 causing protrusions 350 on the clamp arms 210, 220 of the track clamps 325 to deform. The pressure-fitted coupling ensures a secure fit between the track clamp 325 and the support base 330. Additionally, shoulders 311, 321 provide additional support to the linear motion guide track 320 against lateral forces bearing on linear motion guide track 320 such as indicated by arrows 358, 359.

Figure 4:
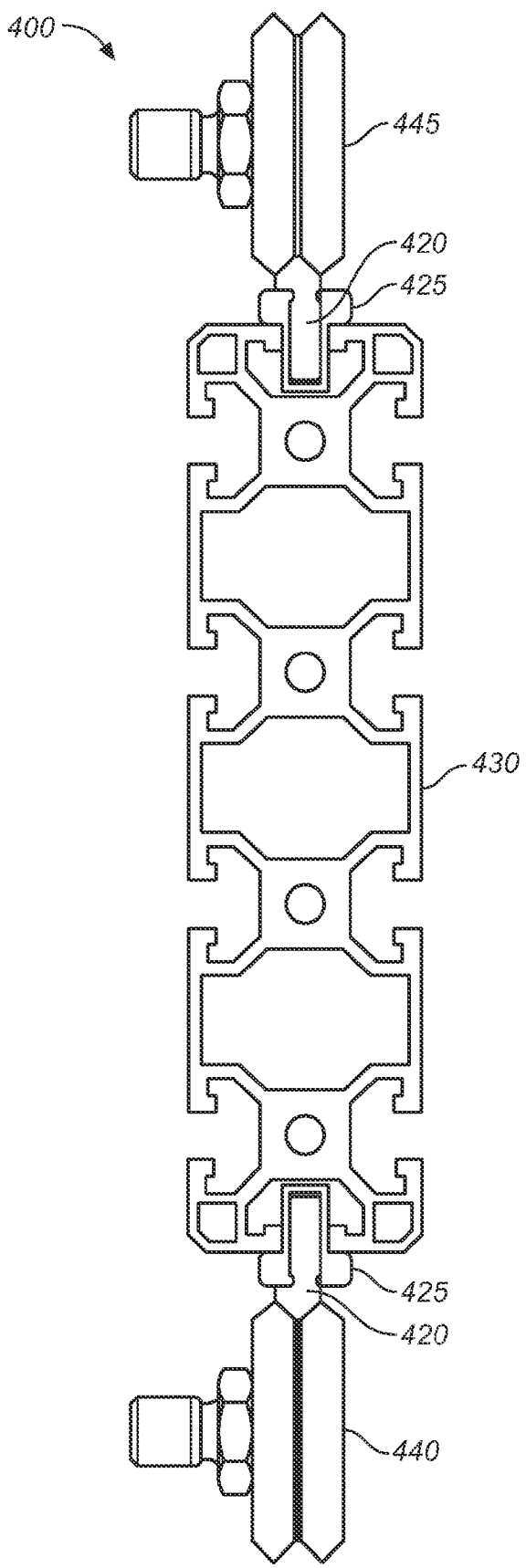
FIG. 4 is an end view of an alternative support base coupled with a pair of linear motion guide tracks via self-coupling track clamps according to the invention.

Referring now to FIG. 4, in another embodiment 400 of the invention, linear motion guide tracks 420 are coupled to a support base 430 via track clamps 425 for controlled movement of guide wheels 440, 445.

Figure 5:
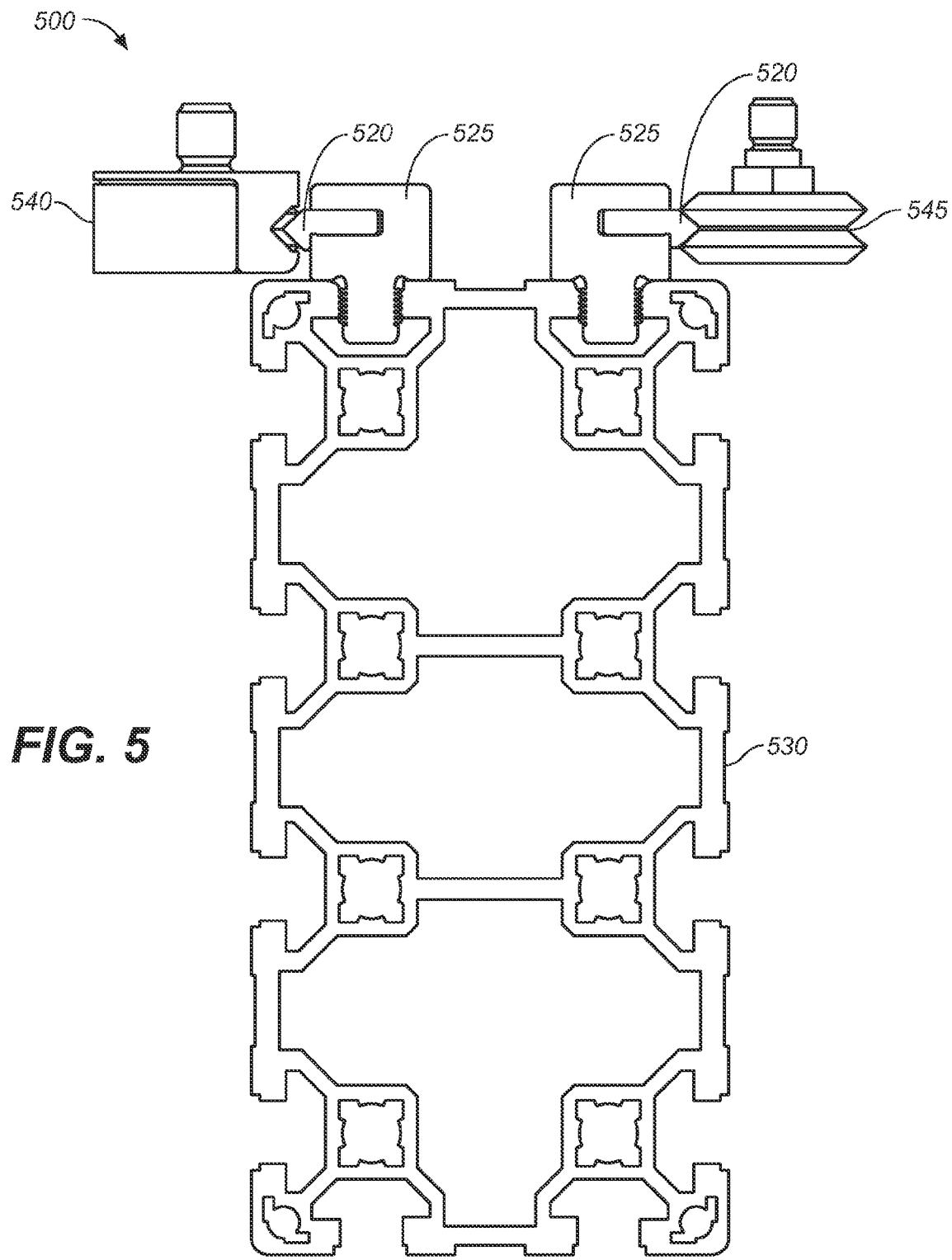
FIG. 5 is an end view of another support base extrusion coupled with a pair of linear motion guide tracks via self-coupling track clamps according to the invention.

FIG. 5 illustrates yet another embodiment 500 of the invention in which linear motion guide tracks 520 are coupled to support base 530 via track clamps 525 for controlling movement of guide wheels 540, 545.

Figure 6:
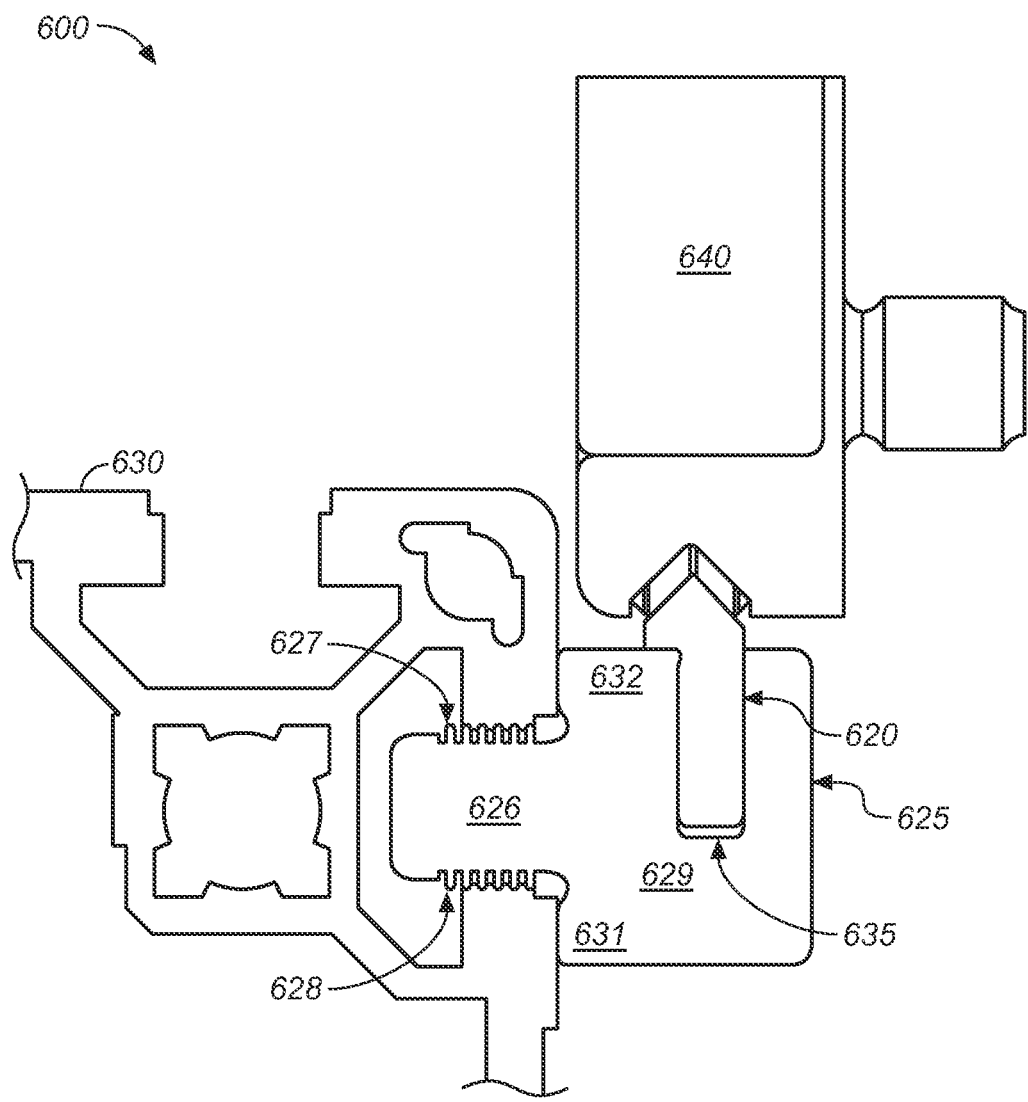
FIG. 6 is an end view of a third alternative support base extrusion coupled with a linear motion guide track via a self-coupling track clamp according to the invention.

As shown in FIG. 6, in still another embodiment 600 of the invention, a linear motion guide track 620 is coupled to a support base 630 via track clamp 625 for controlling movement of a guide wheel 640. The track clamp 625 comprises a clamp body 629 and a plug section 626 extending from the clamp body 629. A plurality of protrusions 627, 628 are disposed on the outer sides of the plug section 626. The clamp body 629 is at least partially wider than the plug section 626, forming shoulders 631, 632 which abut the surface of the support base 630. A channel 635 configured to hold the linear motion guide track 620 is disposed in the clamp body 629 in orthogonal disposition relative to plug section 626.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

It will be readily apparent to those having ordinary skill in the art that a track clamp according to the invention, and related components as discussed above, may have various sizes, shapes and appearances. In some embodiments of the invention, a track clamp may be comprised of steel or stainless steel and the track clamp may be manufactured using an extrusion process or by metal injection molding.

The simple and secure coupling ability of the present invention provides distinct and useful advantages over prior art approaches to joining linear motion guide tracks to support bases without the use of fasteners. For example, cost savings are realized because linear motion tracks can be easily assembled without expensive and complicated tools by using track clamps according to the invention. Additionally, the time to install a linear motion guide track is reduced by eliminating complicated assembly operations. Investments in new support bases are unnecessary and greater manufacturing consistency is achieved by using a track clamp that is compatible with different support bases. Finally, track clamps according to the invention provide a more secure fastener-free coupling between a guide track and a support base than is found in the prior art.

The foregoing description of the invention is illustrative only and is not intended to limit the claimed invention. Other embodiments of the invention will readily be suggested to persons of ordinary skill in the art and the spirit and scope of the invention is limited only by the terms of the following claims and their legal equivalents.

The invention claimed is:

1. A self-coupling track clamp for securing a linear motion guide track to a support base, the support base having one or more slots, each of the one or more slots having opposing inner faces defining a slot width, the self-coupling track clamp comprising:
   a clamp body having a plug portion and an outwardly-opening guide track-receiving channel, said plug portion including a pair of oppositely-facing outer surfaces defining a plug width narrower than the slot width, said channel configured for receiving and holding the linear motion guide track,
   the outer surfaces of said plug portion each having one or more outwardly-extending deformable protrusions, each of said one or more protrusions having an outer edge, the distance between the outer edges of said protrusions of each of said outer surfaces defining a protrusion width, said protrusion width wider than the slot width, and
   a coupled configuration for coupling a track clamp received in said channel with the support base, in said coupled configuration said plug portion for press-fitting into a selected one of the one or more slots of the support base, such that upon said press-fitting said protrusions deform and abut against the inner faces of the slot, thereby joining said clamp body to the support base.

2. The self-coupling track clamp of claim 1, the guide track including an guide surface and a retention block extending from the guide surface, the guide surface for engaging a guide wheel, wherein:
   said track-receiving channel is disposed in said plug portion, the outer surfaces of said plug portion and said channel defining a pair of clamp arms, said track-receiving channel for receiving the retention block of a guide track,
   such that engagement of the protrusions of the plug portion with the inner faces of a selected one of the one or more slots of the support base deflects said clamp arms inwardly for clamping the retention block of a guide track received between the inner faces of the slot in said channel.

3. The self-coupling track clamp of claim 2 further comprising:
   at least one of said clamp arms having an outwardly extending shoulder,
   wherein, when said plug portion is inserted in a selected one of the one or more slots of the support base, abutment of said shoulder against the support base provides additional support for the plug portion against lateral forces bearing on a guide track received in the slot.

4. The self-coupling track clamp of claim 2 further comprising:
   each of said pair of clamp arms having an outwardly extending shoulder,
   wherein, when said plug portion is inserted in a selected one of the one or more slots of the support base, abutment of said shoulder against the support base provides additional support for the plug portion against lateral forces bearing on a guide track received in the slot.

5. The self-coupling track clamp of claim 4, the support base having an outwardly-facing top surface, the one or more slots of the support base extending inwardly from the top surface, wherein:
   in said coupled configuration the shoulders of each of said pair of clamp arms are for abutting engagement with the top surface of the support base.

6. The self-coupling track clamp of claim 2 wherein:
   in said coupled configuration, portions of said clamp arms are disposed between and in abutting engagement with the inner faces of one of the one or more slots of the support base, and a linear motion guide track is disposed between said portions of said clamp arms.

7. The self-coupling track clamp of claim 1 wherein:
   said protrusions are capable of forming a cold-pressure solid state weld with the support base.

8. The self-coupling track clamp of claim 1, the support base having an outwardly-facing top surface, the one or more slots of the support base extending inwardly from the top surface, wherein:
   said clamp body forms oppositely-facing shoulders extending laterally relative to said plug portion, and
   in said coupled configuration the shoulders of said clamp body are for abutting engagement with the top surface of the support base.

9. A self-coupling track clamp for securing a linear motion guide track to a support base, the support base having one or more slots, each of the one or more slots having opposing inner faces defining a slot width, the self-coupling track clamp comprising:
   a clamp body having a plug portion and an outwardly-opening guide track-receiving channel disposed in said plug portion, said plug portion including a pair of oppositely-facing outer surfaces defining a plug width narrower than the slot width, the outer surfaces of said plug portion and said channel defining a pair of clamp arms, said channel configured to receive the linear motion guide track,
   the outer surfaces of said plug portion each having one or more outwardly-extending deformable protrusions, each of said one or more protrusions having an outer edge, the outer edges of said protrusions defining a protrusion width, said protrusion width wider than the slot width, and
   a coupled configuration for coupling a track clamp received in said channel with the support base, in said coupled configuration said plug portion for press-fitting into a selected one of the one or more slots of the support base, such that upon said press-fitting said protrusions deform and abut against the inner faces of the slot, and said protrusions inwardly deflecting said clamp arms for clamping said guide track in said channel, thereby joining said clamp body to the support base.

10. A self-coupling track clamp for securing a linear motion guide track to a support base, the support base having one or more slots, each of the one or more slots having opposing inner faces defining a slot width, the self-coupling track clamp comprising:
   a clamp body having a plug portion and an outwardly-opening guide track-receiving channel, said plug portion extending from said clamp body in a first direction and including a pair of oppositely-facing outer surfaces, said outer surfaces defining a plug width narrower than the slot width, said channel opening in a second direction orthogonal to said first direction and configured for receiving and holding the linear motion guide track, the outer surfaces of said plug portion each having one or more outwardly-extending deformable protrusions, each of said one or more protrusions having an outer edge, the distance between the outer edges of said protrusions of each of said outer surfaces defining a protrusion width wider than the slot width, wherein, deformation of said protrusions against the inner surfaces of one of a selected one of the one or more slots of the support base upon press fitting said plug portion into the slot securely joins said clamp body to the support base for coupling a guide track received in said channel to the support base.

11. The self-coupling track clamp of claim 10 wherein:
when said plug portion is inserted in the selected slot, abutment of a portion of said clamp body on at least one side of said plug portion against the support base provides additional support for the plug portion against lateral forces bearing on a guide track received in the slot.

12. The self-coupling track clamp of claim 11 wherein:
when said plug portion is inserted in a selected one of the one or more slots of the support base, portions of said clamp body on opposite sides of said plug portion abut the support base.

* * * * *